Oct. 25, 1938.  I. ROČIĆ  2,134,377
MASTER COOKER COMBINATION
Original Filed Sept. 25, 1935
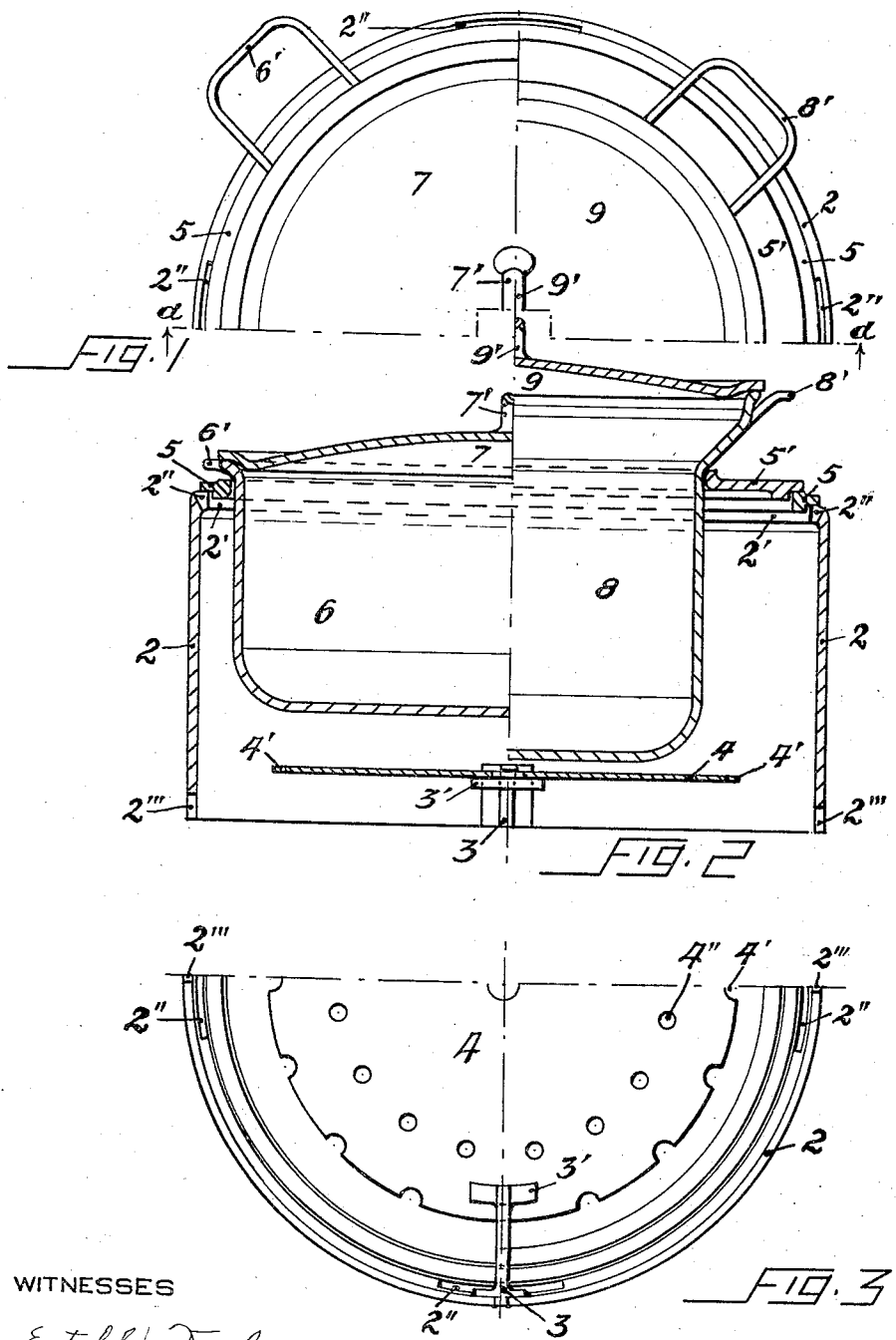

Patented Oct. 25, 1938

2,134,377

UNITED STATES PATENT OFFICE 2,134,377

MASTER COOKER COMBINATION

Ivan Ročić, New York, N. Y.

Refiled for abandoned application Serial No. 42,060, September 25, 1935. This application January 28, 1938, Serial No. 187,501

5 Claims. (Cl. 53—1)

This invention relates to cooking utensils and more particularly to devices disposable over an open fire and having means for supporting food containing receptacles therein and is refiled for abandoned application, Serial No. 42,060, filed September 25, 1935.

An object of the invention is to provide a cylindrical housing, open at the bottom to be placed over a gas or oil burner or other source of heat, and having at its upper end means to engage and support food containers of variant sizes.

A further feature is in the provision of means to disseminate the heat in a manner to cause a substantially uniform application to the surfaces of the containers entered into the housing, preventing waste of the fuel and materially reducing the time in cooking.

These and other advantageous purposes, which will hereafter appear, are accomplished by the novel construction, combination and arrangement of parts hereinafter described and illustrated in the accompanying drawing, constituting a material component of this disclosure, and in which:—

Figure 1 is a partial top plan view of an embodiment of the invention, showing food containers of different sizes in operative position therein.

Figure 2 is a vertical sectional view taken on line a—a of Figure 1.

Figure 3 is another partial top plan view with the containers omitted.

Referring in greater detail to the drawing, the numeral 2 designates a wall of the hollow cylindrical housing having an inreaching flange 2' at the end of its open upper end, the flange provided with a plurality of elongated slots 2" through which the heat escapes after its utilization, while in the bottom edge are recesses 2'" for the entrance of air.

Fixed to the wall 2, near its bottom, is an inreaching support 3 having at its inner end a broad pad 3' to which is attached a flat circular disc 4 spreading the heat entering the housing.

The disc 4 is provided with a plurality of peripheral notches 4' and also contains a concentric row of spaced apertures 4" which permit the current of hot air to pass through.

Loosely mounted on the inreaching flange 2' is a container support ring 5 for the largest size of cooking receptacle as 8, and suited to engage in the ring is an adapter annulus 5' suited to cooking receptacles of lesser diameter as indicated at 6.

The larger container 8 is provided with handles 8', and the smaller with corresponding handles 6'; covers respectively 7 and 9, for the containers, have handles 7' and 9' for convenience in operation.

While the preferred form of the invention is illustrated and described herein, variations and modifications may be made without departure from the spirit of the appended claims.

Having described the invention, what is claimed as new and desired to secure by Letters Patent, is:—

1. A cooking utensil comprising an upright cylindrical housing open at both ends, and disposable over a source of heat, an inreaching flange on the upper end of said housing, a container receiver ring mounted on said flange, and a perforate plate spacedly supported within the lower portion of said housing to cause dissemination of the heat.

2. A cooking utensil comprising a cylindrical housing open at its upper and lower ends and disposable over a heat source, an inreaching annular flange on the upper edge of said housing, said flange having a plurality of elongated slots and its bottom edge plurally recessed, an adapter ring engaging said flange to support cooking receptacles within said housing, and a disc supported in the lower portion of said housing, said disc having a notched periphery and containing a plurality of apertures.

3. A cooking utensil comprising an upright hollow body having an open lower end disposable over a heat source, an inturned flange on its open upper end, adapter rings interchangeably seated on said flange to support cooking receptacles of variant diameters, means in the upper and lower portions of the wall of said body adapted to produce an air draft, and means in the lower portion of said body to cause dissemination of heat uniformly in said body.

4. A cooking utensil comprising an open upright cylindrical casing having an inturned margin at its upper edge, a ring seated on said margin and having a part engageable therein, an adapter ring removably engaged on the first named ring, a perforate heat distributing disc spaced within the wall of said casing, and a single support extending from the casing wall to carry said disc.

5. A cooking utensil comprising an open topped upright cylindrical casing having an imperforate wall and an inwardly flanged margin at its upper edge, said flanged margin containing elongated narrow openings for the passage of air, a container support ring removably engaged on said margin, and an adapter annulus to engage said ring.

IVAN ROČIĆ.